July 6, 1943.   R. P. LEWIS   2,323,548
LUBRICANT SEAL
Filed May 13, 1941   2 Sheets-Sheet 1

ROBERT P. LEWIS
INVENTOR.

BY Laurence C. Witker
ATTORNEY.

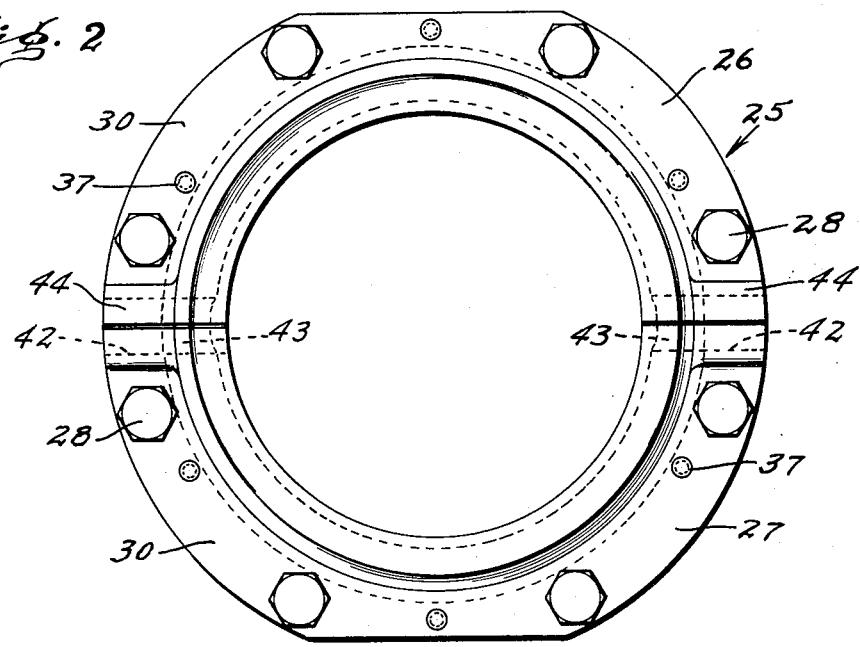
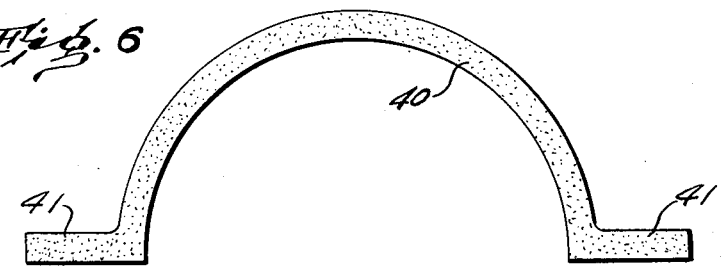
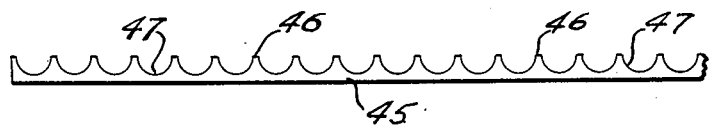

Patented July 6, 1943

2,323,548

UNITED STATES PATENT OFFICE 2,323,548

LUBRICANT SEAL

Robert P. Lewis, Toledo, Ohio, assignor to Spicer Manufacturing Corporation, Toledo, Ohio, a corporation of Virginia Application May 13, 1941, Serial No. 393,225

6 Claims. (Cl. 286—15)

This invention relates to an improved lubricant seal and is particularly directed to a split seal that can be applied to a partly spherical surface such as an enclosed steering knuckle joint of an automotive vehicle.

An object of the invention is to provide sealing means of the above type that will prevent the escape of lubricant from the joint housing and at the same time form an effective seal against the ingress of water and foreign particles.

Another object of the invention is to provide a seal between a pivotal housing member and a stationary housing member of generally spherical shape, the seal being an annulus formed of mating half sections to facilitate assembly and disassembly.

A further object of the invention is to provide a seal which comprises a plurality of prefabricated parts each being a generally semi-circular element having overlapping and mating end portions to enhance the sealing effect of the structure.

Further objects and advantages will become apparent from a study of the following description taken in connection with the accompanying drawings, in which:

Figure 2 is a front elevation of the assembled sealing structure;

Figure 6 is a front elevational view of the flexible sealing element; and

Figure 7 is a fragmentary developed view of the pressure strip.

Figure 1:
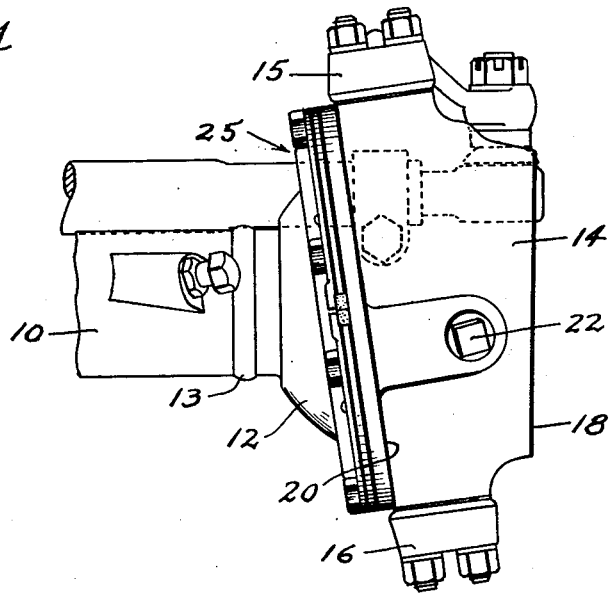
Figure 1 is a fragmentary elevational view of a driving and steering knuckle joint incorporating the sealing means of the present invention.
Figure 3:
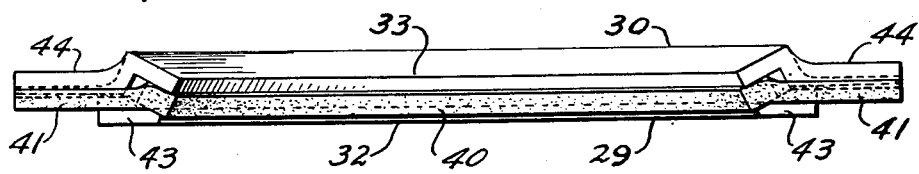
Figure 3 is an end view of one of the assembled half sections.

Referring to the drawings, Figure 1 illustrates the stationary and movable housing parts of a driving and steering axle construction in which is incorporated a form of the invention. The reference number 10 indicates a tubular axle housing having an enlarged partly spherical stationary or inner housing member 12 secured thereto as by welding at 13. An outer pivotal housing part 14 is connected to housing 12 by means of suitable king pins (not shown) located and retained by means of upper and lower cap assemblies 15 and 16. The outer or front face 18 of the housing 14 provides a surface against which the wheel spindle (not shown) is secured, while the inner or rear face 20 overlies the spherical surface of the inner housing 12. The king pin axis is preferably inclined from the vertical to facilitate steering movement, and the face 20 of the housing 14 is likewise inclined and bounds a circular opening of a size sufficient to receive the greatest diameter of the inner housing 12.

A universal joint of suitable design is provided within the two part casing for driving and at the same time permitting dirigibility of the wheel. In order to lubricate such joint, as well as the king pin bearings, the casing is arranged to contain lubricant to the level of a filler and inspection plug 22 located on the side of housing part 14. To retain such lubricant in the casing, and prevent the ingress of foreign matter such as dust, dirt and water, a sealing structure indicated generally at 25 is employed. As shown in Figure 2, the sealing means 25 is of ring form comprising two half sections 26 and 27 provided with a plurality of apertures to receive screws 28 to secure the seal in position on the rear face of housing 14.

Each of the sections 26 and 27 is made up of two half washer-like parts 29 and 30, the inner part 29 having a locating flange 31 formed thereon and its inner periphery turned downwardly at 32. Outer part 30 is formed with an offset down turned inner peripheral portion 33 adapted to lie parallel to portion 32 in spaced relation thereto in order to provide a channel 35 when the parts are assembled. Parts 29 and 30 may be die cast, in which event part 29 is preferably formed with integral rivet pins 37, and the part 30 with holes 38 located to match with the pins 37 so that the parts may be rigidly riveted together upon assembly. A gasket 39 is interposed between the parts 29 and 30 prior to riveting to eliminate any possibility of leakage between the parts. When secured to the housing 14 the peripheral portions 32 and 33 are inclined inwardly toward the spherical casing 12 and thus provide locating and retaining means for a flexible packing or sealing element 40. The element 40 is square in cross section and of generally semi-circular shape as shown in Figure 6 and is made of felt or the like material suitably treated with a composition consisting, for example, of 1 part of paraffin and 4 parts of petrolatum to enhance the life of the felt as well as to insure smooth wiping action on the outer surface of the casing 12.

In addition to its semi-circular body portion the element 40 is formed with radial end portions 41 adapted to seal the abutting ends of the sections 26 and 27. To accommodate these end portions 41, the ends of inner part 29 are partially foreshortened at 42 to provide tongues 43 which complete the semi-circle, while the outer part 30 has a slightly raised portion 44 at each end thereof. Thus, adjacent the inner periphery of the parts, the end portions 41 of the sealing elements lie between the tongues 43 and the portions 44 and extend slightly beyond the ends of the sections 26 and 27 to provide a felt to felt contact therebetween. By this arrangement the elements 40 also serve to seal the split between the half sections.

Figure 4:
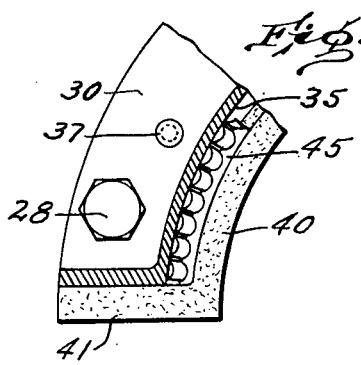
Figure 4 is a fragmentary sectional detail illustrating the arrangement of elements.
Figure 5:
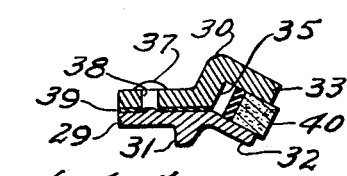
Figure 5 is a sectional view through the seal assembly.

In order to complete the seal structure and insure positive engagement between the sealing element 40 and the spherical surface of the housing 12, a pressure strip 45 is interposed between the channel 35 and the element 40. The pressure strip 45 is of synthetic rubber or like oil resistant material provided with a series of alternate projections and recesses 46 and 47, respectively, along one side. As shown in Figure 4, the projections 46 engage the bottom of the channel 35 against which they are initially compressed, the strip 45 providing a resilient cushion to urge the element 40 radially inwardly or toward the housing 12, with a uniform pressure throughout its length.

The seal structure is applicable to other curved surfaces either in its circular or semi-circular form to provide an effective seal between relatively movable parts. For example, it will be clear that rotary and sliding movement as well as relative oscillatory movement between such parts may be sealed against lubricant leakage. Thus it will be clear that a split seal has been provided which can be readily applied about a curved surface, and which can be installed after a steering knuckle joint or other similar structure has been assembled, and at the same time provide an adequate sealing relationship. Further, the parts themselves are readily fabricated in quantities, thereby making their production very economical.

What I claim is:

1. A sealing annulus adapted for application to a spherical casing member comprising a pair of semi-circular sections, each section including a pair of half washers, the inner periphery of the half washers being turned inwardly to provide an angularly disposed channel, a semi-circular flexible sealing element arranged in said channel, and a flexible pressure strip interposed between the channel and said sealing element for urging the latter into engagement with the casing member.

2. A lubricant seal adapted for application to a curved surface comprising a semi-circular section including a pair of half-washers, a channel formed at the inner periphery and across the ends of the section, a generally semi-circular sealing element in said channel, and a pressure strip interposed between said channel and said sealing element for urging the latter into engagement with the curved surface.

3. A lubricant seal adapted for application to a curved surface comprising a semi-circular section including a pair of half-washers rigidly secured together, a channel formed at the inner periphery and across the ends of said section, a semi-circular sealing element having radial extensions at its end portions arranged in said channel, and a synthetic rubber pressure strip interposed between said channel and said sealing element for urging the latter into engagement with the curved surface.

4. Sealing means comprising a two part casing, one casing part having a partly spherical outer surface, a diametrically split annulus detachably secured to the other part, a groove in the inner periphery of said annulus and inclined toward the partly spherical surface, flexible sealing means in said groove having end portions in the split of said annulus, and a scalloped non-metallic pressure strip in said groove for urging said sealing means into sealing engagement with said partly spherical surface.

5. As an article of manufacture, a semi-annular sealing element comprising two mating parts rigidly secured together, a channel formed at the inner peripheral edges of said parts and along the radial end portions thereof, a sealing strip disposed in said channel, said sealing strip being of generally arcuate shape and having radial extensions at its end portions, and a non-metallic pressure strip underlying the arcuate portion of said sealing strip.

6. A lubricant seal for sealing the joint between a stationary part having a spherical surface and a movable part pivotally connected to the stationary part, comprising a sealing annulus formed of a plurality of semi-circular portions secured to the movable part, each portion including a pair of metallic half washers riveted together, a channel at the inner periphery thereof inclined toward the spherical surface, a flexible sealing element in said channel having radial extensions overlapping the ends of said half washer, and a resilient pressure strip underlying said sealing element for urging the latter into intimate contact with the spherical surface.

ROBERT P. LEWIS.